(12) United States Patent
Gutierrez et al.

(10) Patent No.: US 6,510,946 B2
(45) Date of Patent: Jan. 28, 2003

(54) VACUUM INSULATED LUNCH BOX

(76) Inventors: Gena Gutierrez, 98 Cernon, Vacaville, CA (US) 95688; Javier Gutierrez, 98 Cernon, Vacaville, CA (US) 95688

( * ) Notice: Subject to any disclaimer, the term of this patent is extended or adjusted under 35 U.S.C. 154(b) by 0 days.

(21) Appl. No.: 09/746,596

(22) Filed: Dec. 20, 2000

(65) Prior Publication Data

US 2002/0074259 A1 Jun. 20, 2002

(51) Int. Cl.[7] .............................................. A45C 11/20
(52) U.S. Cl. .................................. 206/545; 206/524.8
(58) Field of Search ................................. 206/521, 522, 206/523, 524.8, 541, 543, 545, 549, 576, 579; 383/3

(56) References Cited

U.S. PATENT DOCUMENTS

| | | | | |
|---|---|---|---|---|
| 3,938,688 A | * | 2/1976 | Ryan | 206/541 |
| 4,215,778 A | * | 8/1980 | Kovins | 206/14 |
| 5,497,883 A | * | 3/1996 | Monetti | 206/545 |
| 5,572,872 A | * | 11/1996 | Hlavacek | 62/3.3 |
| 5,671,846 A | * | 9/1997 | Frank | 190/111 |
| 5,788,078 A | * | 8/1998 | Fuss | 206/521 |
| 6,135,277 A | * | 10/2000 | Armstrong | 206/314 |
| 6,260,360 B1 | * | 7/2001 | Wheeler | 362/371 |

FOREIGN PATENT DOCUMENTS

| | | | |
|---|---|---|---|
| FR | 2 674 411 | * | 10/1992 |
| WO | WO 94/10063 | * | 5/1994 |

* cited by examiner

*Primary Examiner*—David T. Fidei
(74) *Attorney, Agent, or Firm*—Carol D. Titus; Gregory Smith & Associates

(57) ABSTRACT

Vacuum Insulated Lunch Box with a rectangular box comprised of a top half and a bottom half, the top half and bottom half each having a double wall construction, the top half and bottom half each having recessed areas to accommodate a plurality of food containers, the top half and bottom half each having an outlet check valve, and the outlet check valves each capable of receiving a tube from a vacuum pump for the purpose of evacuating the cavity of each said lunch box half. A preferred embodiment includes further comprising a built in vacuum pump.

20 Claims, 3 Drawing Sheets

VACUUM INSULATED LUNCH BOX

BACKGROUND OF THE INVENTION

This invention relates generally to the field of storage boxes, and more particularly to a vacuum Insulated Lunch Box.

Lunch boxes are known. They are generally used by people to take a meal from a home environment to a work environment. They can range from a simple bag enclosure to a more robust metal or plastic enclosure.

A number of existing lunch boxes attempt to insulate the enclosure by using various insulating materials. However, all of the existing insulated lunch boxes that have been tested by this inventor have shown less than desirable results as far as keeping a hot meal, such as soup, close to the temperature at which it was originally prepared. Attempts have been made to help keep a lunch box's contents cold by the addition of a cold pack, however this involves the addition of a separate item that can be inconvenient for the user.

SUMMARY OF THE INVENTION

The primary object of the invention is To provide a lunch box that keeps foods stored inside hot or cold for extended periods of time.

Another object of the invention is to provide a lunch box that can keep one item of food hot and another item of food cold at the same time.

Other objects and advantages of the present invention will become apparent from the following descriptions, taken in connection with the accompanying drawings, wherein, by way of illustration and example, an embodiment of the present invention is disclosed.

Vacuum Insulated Lunch Box comprising: a rectangular box comprised of a top half and a bottom half, said top half and bottom half each having a double wall construction, said top half and bottom half each having recessed areas to accommodate a plurality of food containers, said top half and bottom half each having an outlet check valve, and said outlet check valves each capable of receiving a tube from a vacuum pump for the purpose of evacuating the cavity of each said lunch box half. An alternate embodiment includes a built in vacuum pump.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
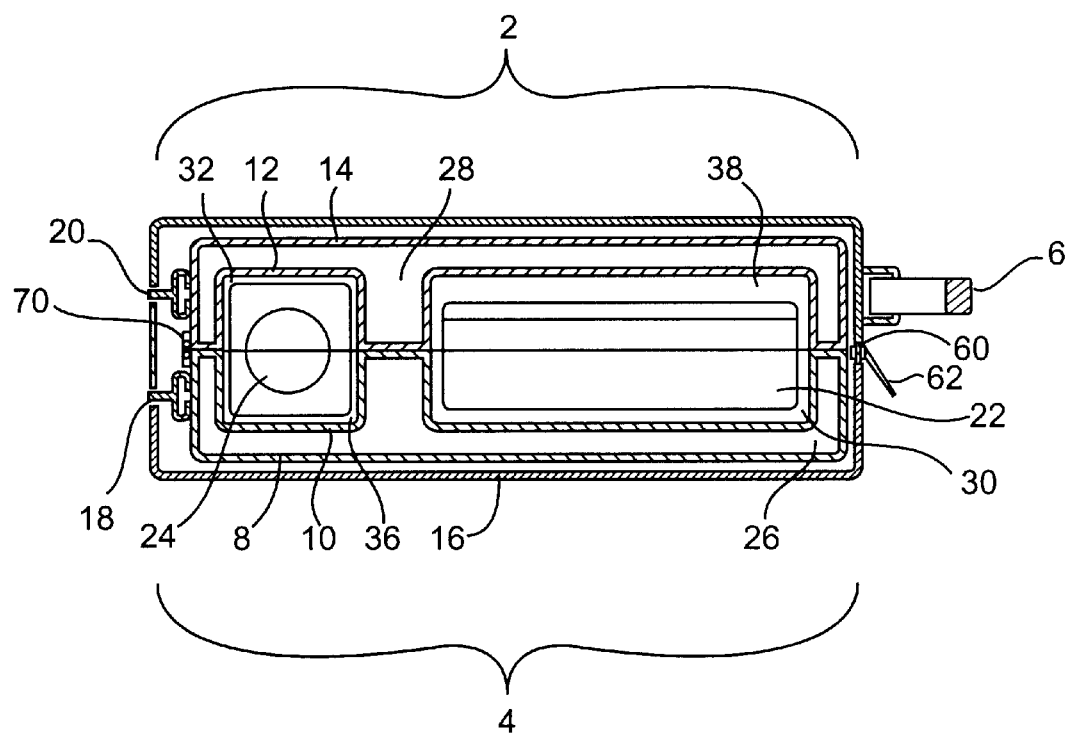
FIG. 1 is a side section view of the lunch box of the present invention
Figure 2:
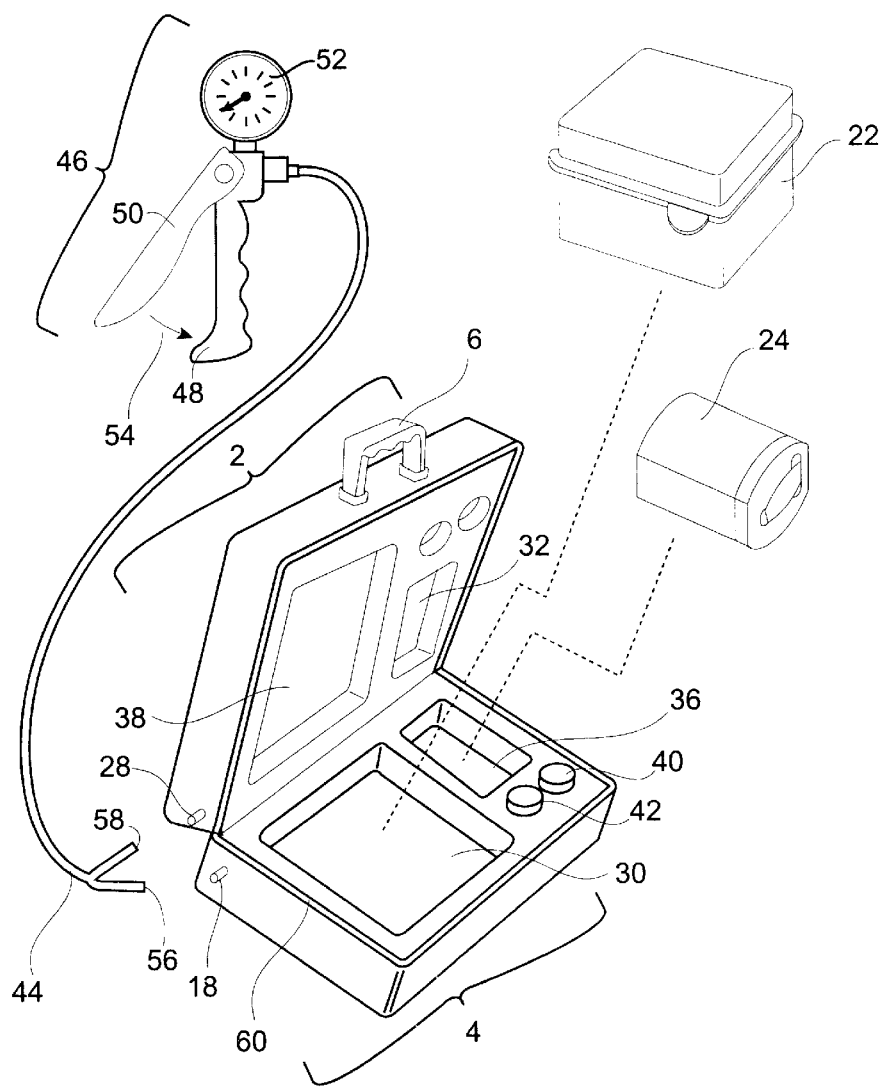
FIG. 2 is a perspective view of the lunch box of the present invention
Figure 3:
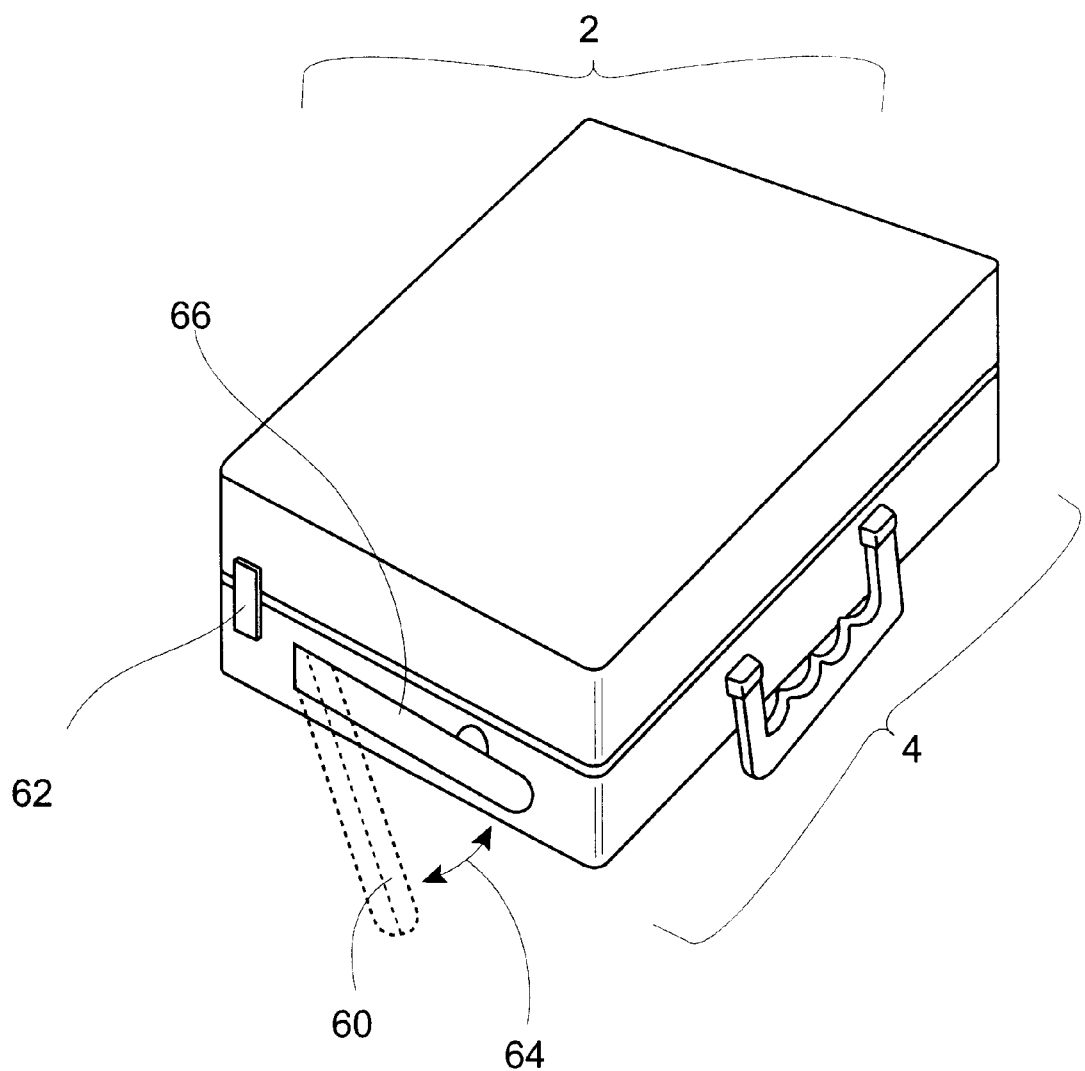
FIG. 3 is a perspective view of an alternate embodiment of the lunch box of the present invention

Referring now to FIG. 1 we see a side section view of the lunch box of the present invention. The lunch box is comprised of two halves 2, 4 attached to each other by hinge member 70. Each half 2, 4, is made of rigid, material such as molded plastic or pressure formed and welded sheet metal. Each half 2, 4 is comprised of a double wall. Half 2 is comprised of outer wall 14 and contiguous inner wall 12. The space 28 between outer wall 14 and inner wall 12 is basically sealed except for check valve 20. The air 28 within walls 12 and 14 can be evacuated from the enclosed space by applying a vacuum pump and associated tube to check valve 20 as shown in FIG. 2. It is well known that a vacuum is one of the best ways to create an insulating effect. Vacuum carafes are commonly known and are meant to hold hot coffee or the like. These vacuum carafes are generally manufactured from glass or metal such as stainless steel. The manufacturing processes used for making vacuum carafes are very specific and generally are limited containers that are essentially cylindrical in shape. Therefore the idea of creating a vacuum within the double walls of a rectangularly shaped lunch box has not been viewed as viable, especially in a plastic construction because plastic is known to be slightly porous over time. The unique aspect of the present invention is that the user can periodically refresh the level of vacuum within the walls of the lunch box by applying a hand operated vacuum pump 46 as shown in FIG. 2 to the valve outlets 18, 20. In this configuration, even if the vacuum deteriorates over time, the user can refresh the vacuum to insure that, at least for the period of one day, the vacuum will be substantial enough to insure the insulating efficacy of the lunch box. My test show that a vacuum of ten inches of mercury is sufficient to keep foods hot for approximately eight hours. Eight hours is generally a long enough period to keep a food such as a hot lunch, hot from time of preparation to time of consumption. Therefore a person can recharge the vacuum before each use if so desired to make sure the vacuum is sufficient to act as a proper insulator. Manually operated vacuum pumps are available such as MetyVac available from Edmund Scientific Company and are relatively inexpensive. A specially designed smaller pump could be manufactured in conjunction with the present invention and, as shown in FIG. 3, a pump 66 can be integrated into side of the housing of the lunch box so that the pump handle 60 can be released 64 by the user. The user would simply push on the handle assemble 60 to replenish the vacuum.

Referring back to FIG. 1 bottom half 4 is made in a similar construction to the top half 2 already discussed above. Outer wall 8 is joined be inner wall 10 forming an enclosed air space 26 that can be evacuated by application of vacuum pump 46 to check valve 18. In the preferred embodiment both top half 2 and bottom half 4 are covered with a flexible material covering 16 such as cloth reinforced vinyl. This covering 16 provides a softer feel to the outer housing and is easily cleanable. The outer covering is held together with a zippered closure 60 that can be opened by standard zipper pull 62. The present configuration shows two main cavities 32, 38. Cavity 38 is larger and is meant to store a covered container 22 that can hold hot soup or any other hot meal the smaller cavity 32 is meant to store a container of a beverage. The beverage can be hot or cold. Since the two compartments are separated by an insulated wall, the insulative nature of the vacuum enhanced enclosure will help keep a hot meal hot and a cold drink cold at the same time. The remaining space in the lunch box has been utilized in this embodiment by incorporating a recessed area for salt and pepper containers 40 42 as shown in FIG. 2. Handle 6 provides a convenient carrying means.

The above descriptions and illustrations show that the lunch box of the present invention can be useful to individuals who want to take a hot lunch to work and would like that lunch to remain hot for the duration of the day without the need for reheating.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A vacuum insulated lunch box, comprising:
   a rectangular box comprised of a top half and a bottom half;
   said top half and bottom half each having a double wall construction, said double wall construction using an inner wall and an outer wall to enclose a first vacuum chamber within said top half and a second vacuum chamber within said bottom half;
   said top half and bottom half each having a plurality of recessed areas created by spaced apart depressions in said inner wall to accommodate a plurality of food containers;
   a first outlet check valve leading from said first vacuum chamber;
   a second outlet check valve leading from said second vacuum chamber; and
   said first and second outlet check valves each capable of receiving a tube from a vacuum pump for the purpose of evacuating said first and second vacuum chambers.

2. Vacuum Insulated Lunch Box as claimed in claim 1 further comprising a built in vacuum pump.

3. In combination:
   the vacuum insulated lunch box of claim 1,
   and a vacuum pump being sized and configured to connect to said first and second outlet check valves, said vacuum pump being detachably attached to said outlet check valve.

4. The vacuum insulated lunch box of claim 1, wherein said top and bottom halves are generally rigid.

5. A vacuum insulated lunch box, comprising:
   a first portion having a vacuum chamber formed by double wall construction,
   a mating second portion,
   a first recess in said first portion,
   a second recess in said first portion,
   said first and second recesses sized and configured to hold containers of food,
   a wall located between said first and second recesses, wherein said vacuum chamber extends into said wall;
   and a outlet check valve leading out of said vacuum chamber.

6. The vacuum insulated lunch box of claim 5, further comprising a vacuum pump connected to said outlet check valve and an actuation handle connected to said vacuum pump.

7. In combination:
   the vacuum insulated lunch box of claim 5,
   and a vacuum pump being sized and configured to connect to said outlet check valve, said vacuum pump being detachably attached to said outlet check valve.

8. The vacuum insulated lunch box of claim 5, wherein said first and second portions are generally rigid.

9. The vacuum insulated lunch box of claim 5, wherein said first and second portions are hingedly connected.

10. The vacuum insulated lunch box of claim 5, further comprising additional recesses in said first portion.

11. The vacuum insulated lunch box of claim 5, wherein said first portion is rectangular.

12. A vacuum insulated lunch box, comprising:
    a top portion having a first vacuum chamber formed by double wall construction,
    a mating bottom portion having a second vacuum chamber formed by double wall construction,
    said top and bottom portions sized and configured to form an enclosure,
    a first recess in said enclosure,
    a second recess in said enclosure,
    said first and second recesses surrounded by said first and second vacuum chambers, said recess sized and configured to hold a container of food,
    an insulating wall located between said first and second recesses, wherein said vacuum chamber extends into said insulating wall;
    a first outlet check valve leading out of said first vacuum chamber,
    and a second outlet check valve leading out of said second vacuum chamber.

13. The vacuum insulated lunch box of claim 12, further comprising a vacuum pump connected to said first and second outlet check valves.

14. In combination:
    the vacuum insulated lunch box of claim 12,
    and a vacuum pump being sized and configured to connect to said first and second outlet check valves, said vacuum pump being detachably attached to said first and second outlet check valves.

15. The vacuum insulated lunch box of claim 12, wherein said top and bottom portions are generally rigid.

16. The vacuum insulated lunch box of claim 12, wherein said top and bottom portions are hingedly connected.

17. The vacuum insulated lunch box of claim 12, further comprising additional recesses in said first portion.

18. The vacuum insulated lunch box of claim 12, wherein said top and bottom portions are rectangular.

19. The vacuum insulated lunch box of claim 12, wherein said double wall construction is formed of an outer wall and an inner wall, said outer wall and said inner wall forming said vacuum chamber therebetween, and wherein depressions in said inner wall form said first and second recesses.

20. The vacuum insulated lunch box of claim 12, wherein said first and second recesses extend into said bottom portion and further comprising a third and a fourth recess extending into said top portion, wherein, when said top portion is placed over said bottom portion, said third recess aligns with said first recess and said fourth recess aligns with said second recess.

* * * * *